United States Patent
Grenier et al.

(10) Patent No.: US 11,396,875 B2
(45) Date of Patent: Jul. 26, 2022

(54) DRY VACUUM PUMP AND METHOD FOR CONTROLLING A SYNCHRONOUS MOTOR OF A VACUUM PUMP

(71) Applicant: PFEIFFER VACUUM, Annecy (FR)

(72) Inventors: Yannick Grenier, Doussard (FR);
Didier Pierrejean, Groisy (FR);
Jean-Marc Paget, Saint Pierre en Faucigny (FR)

(73) Assignee: PFEIFFER VACUUM, Annecy (FR)

( * ) Notice: Subject to any disclaimer, the term of this patent is extended or adjusted under 35 U.S.C. 154(b) by 242 days.

(21) Appl. No.: 16/768,907

(22) PCT Filed: Dec. 5, 2018

(86) PCT No.: PCT/EP2018/083695
§ 371 (c)(1),
(2) Date: Jun. 2, 2020

(87) PCT Pub. No.: WO2019/137700
PCT Pub. Date: Jul. 18, 2019

(65) Prior Publication Data
US 2021/0277900 A1    Sep. 9, 2021

(30) Foreign Application Priority Data
Jan. 9, 2018 (FR) ...................... 18 50164

(51) Int. Cl.
*F04C 25/02* (2006.01)
*F04C 18/12* (2006.01)
(Continued)

(52) U.S. Cl.
CPC ............ *F04C 25/02* (2013.01); *F04C 18/126* (2013.01); *F04C 23/02* (2013.01);
(Continued)

(58) Field of Classification Search
CPC ...... F04C 25/02; F04C 18/16; F04C 29/0085; F04C 18/126; F04C 28/08; F04C 2220/12;
(Continued)

(56) References Cited

U.S. PATENT DOCUMENTS 4,785,213 A * 11/1988 Satake ................... H02K 17/36
310/116
4,920,293 A * 4/1990 Kanda ................... H02K 17/36
310/116
(Continued)

FOREIGN PATENT DOCUMENTS

EP    0 447 257 A2    9/1991
EP    1 900 943 A1    3/2008
(Continued)

OTHER PUBLICATIONS

Combined Chinese Office Action and Search Report dated Jan. 29, 2022 in Chinese Patent Application No. 201880079549.0 (with English translation), 12 pages.
(Continued)

*Primary Examiner* — Dominick L Plakkoottam
(74) *Attorney, Agent, or Firm* — Oblon, McClelland, Maier & Neustadt, L.L.P.

(57) ABSTRACT

A dry vacuum pump is provided, including two shafts, respectively supporting at least one pumping rotor being configured to synchronously rotate in reverse in order to convey a gas to be pumped from an intake of the dry vacuum pump to an outlet; and a synchronous motor configured to rotate one shaft of the two shafts, the synchronous motor including a rotor coupled to the shaft, a first stator with windings arranged around the rotor, and at least one second stator with windings arranged around the rotor, the windings of the stators being configured to be supplied individually or simultaneously in order to adapt a power of the synchronous (Continued)

motor to a pumping load. A method for controlling a synchronous motor of a vacuum pump is also provided.

14 Claims, 3 Drawing Sheets

(51) Int. Cl.
*H02K 7/14* (2006.01)
*F04C 23/02* (2006.01)
*F04C 29/00* (2006.01)

(52) U.S. Cl.
CPC ........... *F04C 29/0042* (2013.01); *H02K 7/14* (2013.01); *F04C 2240/40* (2013.01)

(58) Field of Classification Search
CPC .......... F04C 23/00; F04C 2/16; F04C 23/001; F04C 15/008; F04C 23/02; F04C 2270/02; F04C 2270/035; F04C 2270/051; F04C 2270/60; F04C 28/06; F04C 29/0042; H02K 16/00; H02K 16/04; H02K 7/14
See application file for complete search history.

(56) References Cited

U.S. PATENT DOCUMENTS

| | | | | |
|---|---|---|---|---|
| 5,144,180 A * | 9/1992 | Satake | ................... | H02K 16/04 310/212 |
| 5,846,062 A * | 12/1998 | Yanagisawa | ............ | F04C 18/16 417/252 |
| 2003/0138327 A1* | 7/2003 | Jones | ....................... | F04B 49/20 417/42 |
| 2004/0075236 A1* | 4/2004 | Radamis | ................. | B60G 13/14 280/124.158 |
| 2004/0075415 A1* | 4/2004 | Sopko | ..................... | H02P 25/18 318/772 |
| 2007/0020107 A1* | 1/2007 | Sauciuc | ................ | F04C 15/008 417/16 |
| 2008/0063536 A1* | 3/2008 | Koshizaka | ............... | F04C 28/06 417/462 |
| 2009/0047142 A1* | 2/2009 | Hozumi | ................... | F04C 25/02 417/244 |
| 2013/0183185 A1* | 7/2013 | Dirscherl | ............ | F04C 29/0078 416/223 R |
| 2013/0259712 A1* | 10/2013 | Kawasaki | ............... | F04C 23/00 417/201 |
| 2013/0343912 A1* | 12/2013 | Miyata | .................... | F04C 28/08 417/44.1 |
| 2015/0037180 A1* | 2/2015 | Abbott | ..................... | H02K 7/11 310/198 |
| 2020/0271120 A1* | 8/2020 | Kimura | ................... | F04C 29/00 |

FOREIGN PATENT DOCUMENTS

| | | |
|---|---|---|
| JP | 2008-69666 A | 3/2008 |
| JP | 2008-261225 A | 10/2008 |
| JP | 2015-220905 A | 12/2015 |
| TW | 201042889 A1 | 12/2010 |
| TW | 201443343 A | 11/2014 |
| TW | 201512542 A | 4/2015 |

OTHER PUBLICATIONS

International Search Report dated Apr. 9, 2019 in PCT/EP2018/083695 filed on Dec 5, 2018, 3 pages.
Combined Taiwanese Office Action and Search Report dated Jul. 8, 2021 in Patent Application No. 107142409 (with English language translation), 10 pages.
Japanese Office Action dated May 10, 2022, in corresponding Japanese Patent Application No. 2020-557381 (with English translation), 15 pages.

* cited by examiner

DRY VACUUM PUMP AND METHOD FOR CONTROLLING A SYNCHRONOUS MOTOR OF A VACUUM PUMP

The present invention relates to a dry vacuum pump and, more specifically, to a synchronous motor of said vacuum pump. The invention also relates to a method for controlling a synchronous motor of a vacuum pump.

Rough-vacuum pumps comprise one or more pumping stages mounted in series, in which a gas circulates that is to be pumped between an intake and an outlet. A distinction is made among known rough-vacuum pumps between those with rotary lobes, also known as "Roots" pumps with two or three lobes, or those with twin claws, also known as "Claw" pumps, or even those with twin screws. Vacuum pumps are also known of the Roots compressor (or "Roots Blower") type that are used upstream of the rough-vacuum pumps to increase the pumping capacity in a high flow situation.

These vacuum pumps comprise two pumping rotors with identical profiles rotating in reverse inside a stator. During rotation, the gas to be pumped is captured in the volume generated by the rotors and the stator and is conveyed by the rotors to the following stage, then is gradually conveyed to the outlet of the vacuum pump.

In some applications, the pumping load significantly changes during use. This is particularly the case between, on the one hand, a step of pumping high gas flows, such as a step of applying a vacuum, starting from atmospheric pressure and, on the other hand, a step of waiting at a low load, such as a step of maintaining the vacuum. It is understood that the motor of the vacuum pump must be able to respond to very different load levels. When it is significantly stressed when the chamber is discharged, the motor is no longer subject to a low ultimate vacuum pressure load. It is thus difficult to optimize the motor of the vacuum pump for these two extreme situations. As a result, optimizing the motor for the highest load results in significant ultimate vacuum pressure stator losses.

One of the aims of the present invention is to propose a dry vacuum pump, for which the motor can be best adapted to the pumping load.

To this end, the aim of the invention is a dry vacuum pump comprising:
  two shafts respectively supporting at least one pumping rotor, the pumping rotors being configured to synchronously rotate in reverse in order to convey a gas to be pumped from an intake of the vacuum pump to an outlet; and
  a synchronous motor configured to rotate one of the shafts, the synchronous motor comprising:
    a rotor coupled to the shaft; and
    a first stator with windings arranged around the rotor,
  characterized in that the synchronous motor comprises at least one second stator with windings arranged around said rotor, the windings of the stators being able to be supplied individually or simultaneously in order to adapt the power of the synchronous motor to the pumping load.

More specifically, for example, the windings of the stators are configured to be supplied individually when the pumping load of the vacuum pump is below a load threshold and to be supplied simultaneously when the pumping load of the vacuum pump is greater than or equal to said load threshold.

It is thus possible to individually supply either of the windings of the stators of the synchronous motor or to simultaneously supply a plurality of windings in order to best adapt the power of the synchronous motor to the evolution of the pumping load by reducing the various stator losses (iron, Joule losses, etc.). It is then possible to optimize the yield of the synchronous motor for various operating points.

Simultaneously supplying the two stators with windings allows a temporary response to be provided for a request for a significant load, which can also allow a reduction in the time taken to apply a vacuum.

A single rotor is used and the two stators can be accommodated in the same casing of the synchronous motor of the vacuum pump. The manufacturing and assembly costs of the vacuum pump are thus limited. Furthermore, the vacuum pump is compact.

The vacuum pump is particularly called a "dry" pump since during operation the at least one rotor rotates inside the stator without any mechanical contact with the stator, which allows the use of oil in the pumping stage to be avoided.

The vacuum pump can comprise one or more of the features described hereafter, taken individually or in combination.

A vacuum pump comprising two rotary shafts is, for example, a vacuum pump with rotary lobes, such as a pump of the "Roots" type or such as a vacuum pump of the "Claw" or screw type.

In the case of a multi-stage vacuum pump, the rotary shaft supports rotors extending into each pumping stage.

The power ratio between the power generated by the first stator and the power generated by the second stator is between 1 and 10, for example.

The vacuum pump is, for example, a rough-vacuum pump comprising a plurality of pumping stages mounted in series, the power ratio between the power generated by the first stator and the power generated by the second stator being between 1 and 5.

The vacuum pump is, for example, a vacuum pump of the Roots type, which is intended to be connected to a chamber, in series and upstream of a rough-vacuum pump.

According to a first embodiment, the rotor comprises electromagnets.

According to a second embodiment, the rotor comprises permanent magnets. At least one permanent magnet of the rotor can be formed by a plurality of permanent magnet elements aligned along the rotor. The permanent magnet elements of the rotor only extend, for example, into the rotor facing the stators with windings.

The vacuum pump comprises, for example, a first speed variator connected to the first stator with windings and a second speed variator connected to the second stator with windings.

The vacuum pump comprises, for example, a control unit connected to the speed variators that is configured to supply the windings of the stators individually or simultaneously in order to adapt the power of the synchronous motor to the pumping load as a function of at least one signal representing the pumping load.

The signal representing the pumping load is, for example, a current-limiting output of one of the speed variators, representing the current consumed by the vacuum pump.

A further aim of the invention is a method for controlling a synchronous motor of a dry vacuum pump as previously described, for pumping a chamber connected to the vacuum pump, characterized in that the windings of the stators are supplied individually when the pumping load of the vacuum pump is below a load threshold and the windings are supplied simultaneously when the pumping load of the vacuum pump is above said load threshold, in order to adapt the power of the synchronous motor to the pumping load as a function of at least one signal representing the pumping load.

For example, the most powerful of the two stators or both stators is/are supplied simultaneously upon start-up of the vacuum pump or in a step of discharging, starting from atmospheric pressure.

A step of discharging, starting from atmospheric pressure, and an ultimate vacuum pumping step can occur cyclically in the chamber, for example.

Further features and advantages of the invention will become apparent from the following description, which is provided by way of an example, and is by no means limiting, with reference to the accompanying drawings, in which.

Throughout these figures, identical elements use the same reference numbers. The following embodiments are examples. Even though the description refers to one or more embodiments, this does not necessarily mean that each reference relates to the same embodiment, or that the features only apply to a single embodiment. Simple features of various embodiments also can be combined or interchanged in order to provide other embodiments.

"Ultimate pressure" is defined as the minimum pressure obtained by a vacuum pump without the introduction of a gas flow.

A rough-vacuum pump is defined as a volumetric vacuum pump, which, using two rotors, sucks in, transfers, then discharges the gas to be pumped at the atmospheric pressure.

A Roots vacuum pump (also called "Roots Blower" or "Roots compressor") is defined as a volumetric vacuum pump, which, using Roots pumping rotors, sucks in, transfers, then discharges the gas to be pumped. A Roots vacuum pump is mounted upstream and in series with a rough-vacuum pump.

Rough and Roots vacuum pumps are dry vacuum pumps.

"Upstream" is understood to be an element that is placed before another element relative to the direction of circulation of the gas. By contrast, "downstream" is understood to be an element placed after another element relative to the direction of circulation of the gas to be pumped, with the element located upstream being at a lower pressure than the element located downstream at a higher pressure.

Figure 1:
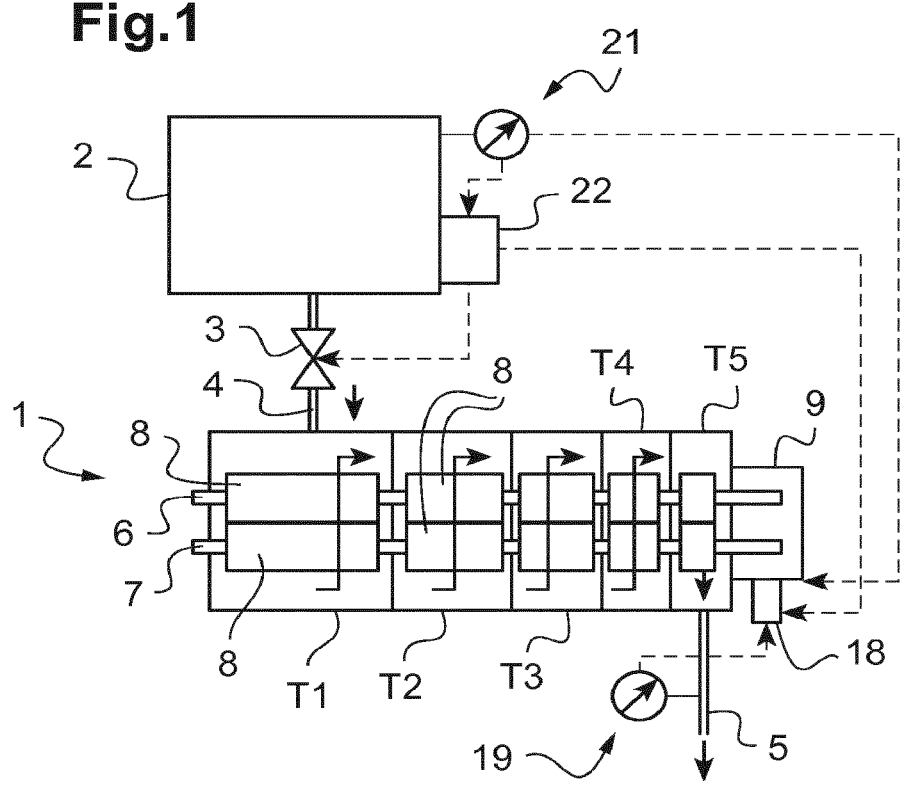
FIG. 1 shows a schematic view of a dry vacuum pump according to a first embodiment, connected to a chamber.

FIG. 1 shows a first example of a dry vacuum pump 1 connected to a chamber 2 via an isolation valve 3.

Pumping load variations can occur in the chamber 2. For example, a step of discharging, starting from atmospheric pressure, and an ultimate vacuum pumping step succeed one another in the chamber 2. The succession of these two steps can occur cyclically.

The chamber 2 is, for example, a load lock chamber. In a manner known per se, a load lock chamber comprises a first door connecting the inside of the chamber with a zone under atmospheric pressure, such as a clean room, for loading at least one substrate, and a second door for unloading the substrate in the process chamber after a vacuum has been applied. Each operation for loading or unloading substrates requires alternately lowering then raising the pressure inside the load lock chamber. The load lock chamber allows an acceptable throughput to be maintained and prevents the presence of any impurities and of any pollution in the atmosphere surrounding the substrate. Load lock chambers are particularly used to manufacture flat display screens or photovoltaic substrates or for manufacturing semi-conductor substrates.

In the first embodiment shown in FIG. 1, the vacuum pump 1 is a multi-stage rough-vacuum pump. A Roots vacuum pump or a turbomolecular vacuum pump can be interposed between the vacuum pump 1 and the chamber 2.

The vacuum pump 1 of this first embodiment comprises a plurality of pumping stages T1-T5, for example, five stages, mounted in series between an intake 4 and an outlet 5 of the vacuum pump 1. Each pumping stage T1-T5 comprises a respective input and output. The successive pumping stages T1-T5 are connected in series one after the other by respective inter-stage channels connecting the output (or the outlet) of the preceding pumping stage to the input (or the intake) of the following stage.

The vacuum pump 1 further comprises two shafts 6, 7, a drive shaft 6 and a driven shaft 7, each supporting pumping rotors 8 extending into the pumping stages T1-T5.

The vacuum pump 1 also comprises a synchronous motor 9 configured to rotate the drive shaft 6. The driven shaft 7 is rotated by a synchronization device of the vacuum pump 1.

The pumping rotors 8 have, for example, lobes with identical profiles, such as those of the "Roots" type (transverse section in the shape of an "eight" or of a "bean") or of the "Claw" type. According to another example, the pumping rotors 8 are of the "screw" type.

The shafts 6, 7 synchronously rotate in reverse. During rotation, the gas sucked in from the input is captured in the volume generated by the pumping rotors 8, and is then conveyed by the rotors 8 to the following stage (the direction of circulation of the gases is shown by the arrows in FIG. 1). The vacuum pump 1 is particularly called a "dry" pump since during operation the rotors 8 rotate inside the stator without any mechanical contact with the stator, which avoids the use of oil in the pumping stages T1-T5.

Figure 2:
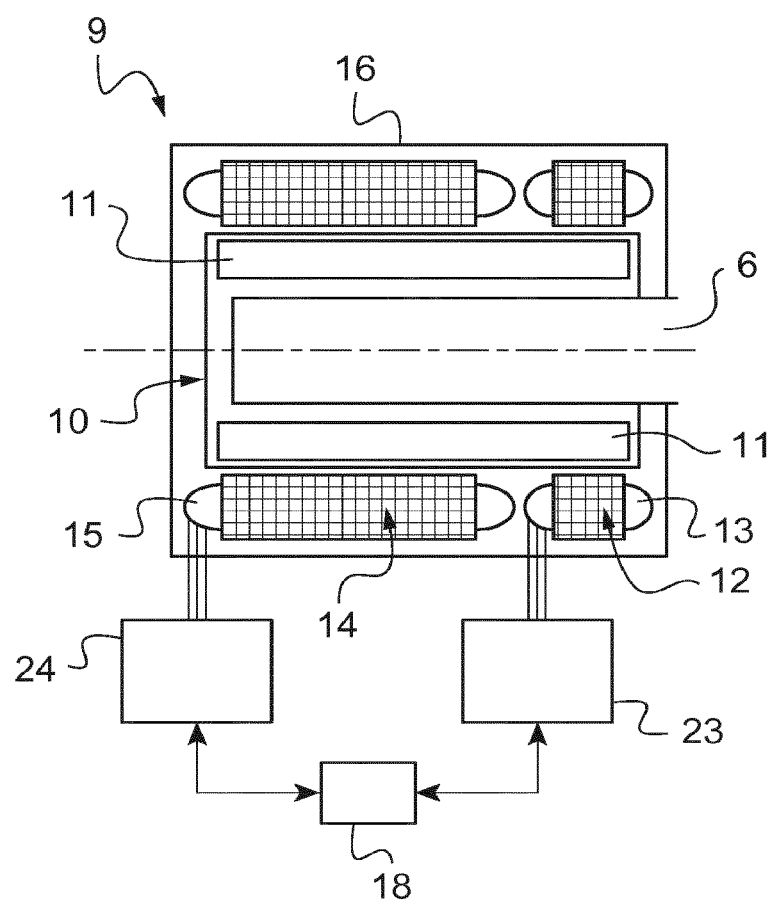
FIG. 2 shows a partial schematic longitudinal section view of a synchronous motor of the vacuum pump of FIG. 1.
Figure 3:
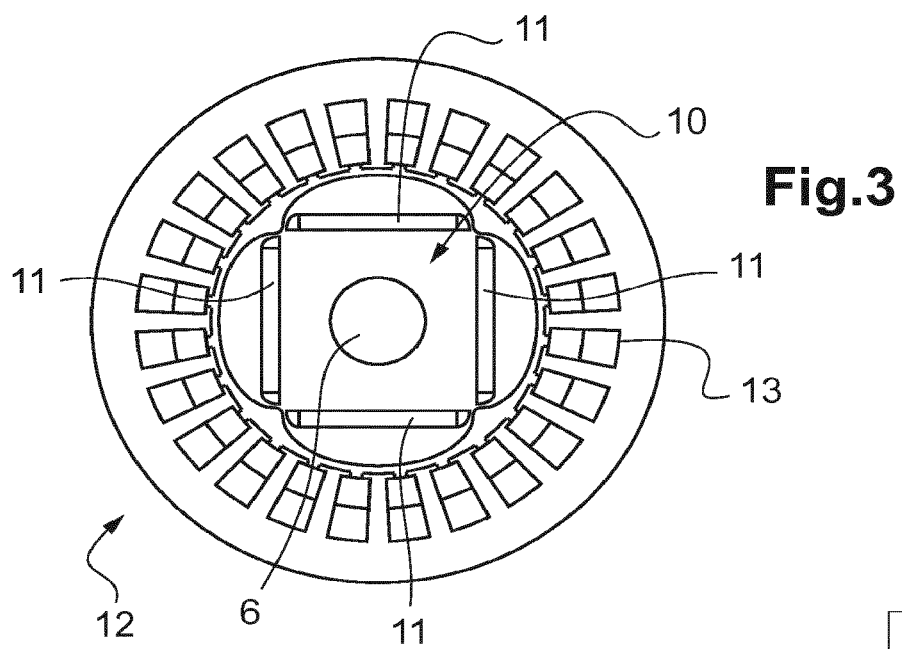
FIG. 3 shows a schematic transverse section view of the synchronous motor of the vacuum pump of FIG. 1.

As is more clearly seen in FIGS. 2 and 3, the synchronous motor 9 comprises a rotor 10 coupled to the drive shaft 6 (for example, it is threaded onto the shaft 6 or is attached to the shaft 6 by resilient coupling or the rotor and the shaft are a single piece), a first stator 12 with windings 13 arranged around the rotor 10 and at least one second stator 14 with windings 15 also arranged around the rotor 10.

The second stator 14 is arranged next to the first stator 12 along the rotor 10, around a distinct portion of the rotor 10. The stators 12, 14 are adjacent, coaxial and mounted in series. The stators 12, 14 are received in a casing 16 of the synchronous motor 9.

According to a first embodiment, the rotor comprises electromagnets. A first stator 12 with windings 13 is thus arranged around the rotor facing electromagnets of the rotor and at least one second stator 14 with windings 15 is also arranged around the rotor facing electromagnets of the rotor.

According to a second embodiment, the rotor 10 comprises permanent magnets 11. A first stator 12 with windings 13 is thus arranged around the rotor 10 facing permanent magnets 11 of the rotor 10 and at least one second stator 14 with windings 15 is also arranged around the rotor 10 facing permanent magnets 11 of the rotor 10.

The permanent magnets 11 are integrated in the rotor 10, for example. They are then also called "IPM" (Interior Permanent Magnet).

In the example of FIG. 2, the permanent magnets 11 located facing a first and a second stator 12, 14 are a single piece. They extend at least from the first stator 12 to the second stator 14 along the rotor 10.

The windings 13, 15 of the stators 12, 14 can be supplied individually or simultaneously in order to adapt the power of the synchronous motor 9 to the evolution of the pumping load.

The vacuum pump 1 can comprise a control unit 18 and two speed variators, a first speed variator 23 being dedicated to supplying the winding 13 of the first stator 12, a second speed variator 24 being dedicated to supplying the winding 15 of the second stator 14.

The control unit 18 comprises one or more controllers or processors adapted to individually control either of the speed variators 23, 24 or both of them at the same time. The control unit 18 is, for example, formed by an electronic control card.

During operation, the supply of the windings 13, 15 of the stators 12, 14 of the synchronous motor 9 of the vacuum pump 1 is modified as a function of at least one signal representing the pumping load, in order to adapt the power to at least one load threshold. The control unit 18 increases the electromotive force of the synchronous motor 9 when the pumping load exceeds the load threshold by simultaneously supplying a plurality of windings 13, 15 and reduces the electromotive force when the pumping load is below the load threshold by individually supplying either one of the windings 13, 15 of the stators 12, 14 of the synchronous motor 9.

The signal representing the pumping load can comprise a signal originating from a sensor 21 of the chamber 2, such as a pressure sensor, or can originate from equipment 22 that controls the sequence of operations of the method in the chamber 2. The signal originating from the equipment 22 can be a signal for closing a contact resulting, for example, from opening/closing a door of the chamber 2. The load threshold is crossed when the pressure inside the chamber 2 exceeds a predetermined threshold or when the contact changes state.

The signal representing the pumping load is, for example, a signal originating from a sensor of the vacuum pump 1, such as a pressure sensor 19 configured to measure the pressure at the outlet 5 of the vacuum pump 1 or such as a power or current sensor configured to measure the power or the current consumed by the vacuum pump 1. The load threshold is crossed when the discharge pressure of the vacuum pump 1 or the power or the current consumed by the vacuum pump 1 exceeds a respective predetermined threshold.

According to one embodiment, the signal representing the pumping load is a current-limiting output of one of the speed variators 23, 24 representing the current consumed by the vacuum pump 1. Indeed, current thresholds may already be provided in the speed variators 23, 24 in order to protect them against surges, which can occur, for example, during the vacuum pump 1 start-up phase.

According to a first embodiment, the power ratio between the power generated by the first stator 12 and the power generated by the second stator 14 is equal to 1. In other words, the windings of the first and of the second stators 12, 14 produce equivalent electromotive forces when they are supplied with an equivalent current supply. Simultaneously supplying the two stators 12, 14 doubles the electromotive force.

According to a second embodiment, the power ratio between the power generated by the first stator 12 and the power generated by the second stator 14 is greater than 1. In other words, the windings 13, 15 of the stators 12, 14 produce different electromotive forces when they are supplied with an equivalent current supply. There are then three possibilities of available powers.

The power ratio is also, for example, below five for a multi-stage rough-vacuum pump (FIG. 1).

Stators with windings producing different powers can be obtained, for example, by increasing the number of turns of the winding 13, 15 of one of the stators 12, 14 or by increasing the diameter of the wire of the winding 13, 15 of one of the stators 12, 14. The number of turns of the windings 15 of the second stator 14 is, for example, greater than the number of turns of the windings 13 of the first stator 12.

The synchronous motor 9 can also comprise more than two stators with windings, such as three or four stators with windings. The various stators with windings have, for example, an increasing respective electromotive force.

A description will now be provided of an example of a method 100 for controlling a synchronous motor 9 of a vacuum pump 1 connected to a load lock such as that shown in FIG. 1, by considering that the pressure inside the chamber 2 is initially the atmospheric pressure and that the isolation valve 3 is closed.

For example, when the equipment 22 orders the opening of the valve 3, a signal originating from the equipment 22 is received at the control unit 18 of the vacuum pump 1. The control unit 18 then simultaneously supplies the two stators 12, 14 of the synchronous motor 9 in order to provide maximum power.

Figure 4:
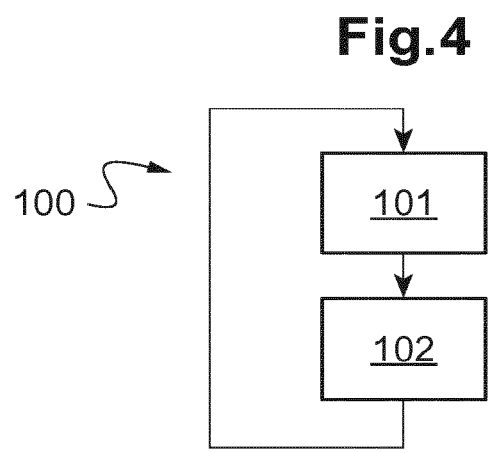
FIG. 4 shows a flowchart of a method for controlling a synchronous motor of a dry vacuum pump.

The pressure inside the chamber 2 begins to decrease (discharge step 101, FIG. 4).

When the pressure inside the chamber 2 crosses a predetermined low pressure threshold, the pumping load is considered to be low enough to supply only one of the two stators 12, 14 (ultimate vacuum pumping step 102, FIG. 4).

After unloading the substrate from the chamber 2, the isolation valve 3 is closed and the pressure inside the chamber 2 is raised to the atmospheric pressure in order to load a new substrate.

A new cycle can then begin.

It is then possible for either of the windings 13, 15 of the stators 12, 14 of the synchronous motor 9 to be supplied individually or for a plurality of said windings to be supplied simultaneously in order to best adapt the power of the synchronous motor 9 to the evolution of the pumping load, while reducing the various stator losses (iron, Joule losses, etc.). It is then possible to optimize the yield of the synchronous motor 9 for various operating points. Simultaneously supplying the two stators 12, 14 with windings 13, 15 thus allows a temporary response to be provided for a request for a significant load and allows a reduction in the time taken to apply a vacuum. A single rotor 10 is used and the two stators 12, 14 can be received in the same casing 16 of the synchronous motor 9 of the vacuum pump 1. The costs are thus reduced, assembly is facilitated and the vacuum pump 1 remains compact.

Figure 5:
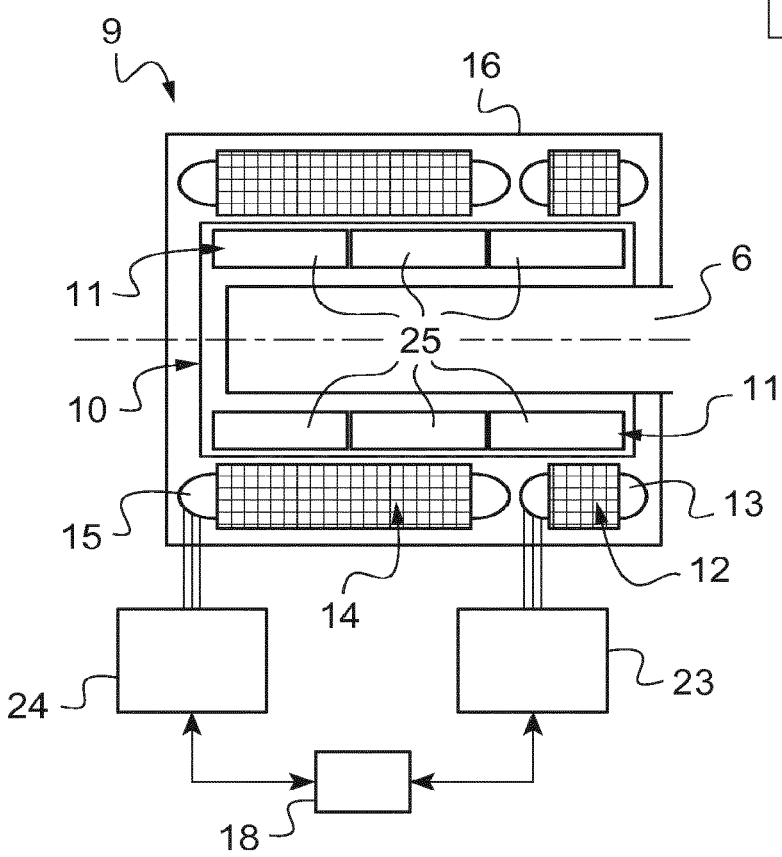
FIG. 5 shows a partial schematic longitudinal section view of a synchronous motor of a vacuum pump according to a second embodiment.

FIG. 5 shows a second embodiment, in which each permanent magnet 11 of the rotor 10 comprises a plurality of permanent magnet elements 25.

The permanent magnet elements 25 are aligned along the rotor 10. They are placed end-to-end along the rotor 10 and extend between the first stator 12 and the second stator 14. A permanent magnet 11 produced by a plurality of separate elements placed end-to-end is easier to produce than a permanent magnet 11 as a single piece. The permanent magnet elements 25 are, for example, inserted one behind the other into a groove provided in the rotor 10.

Figure 6:
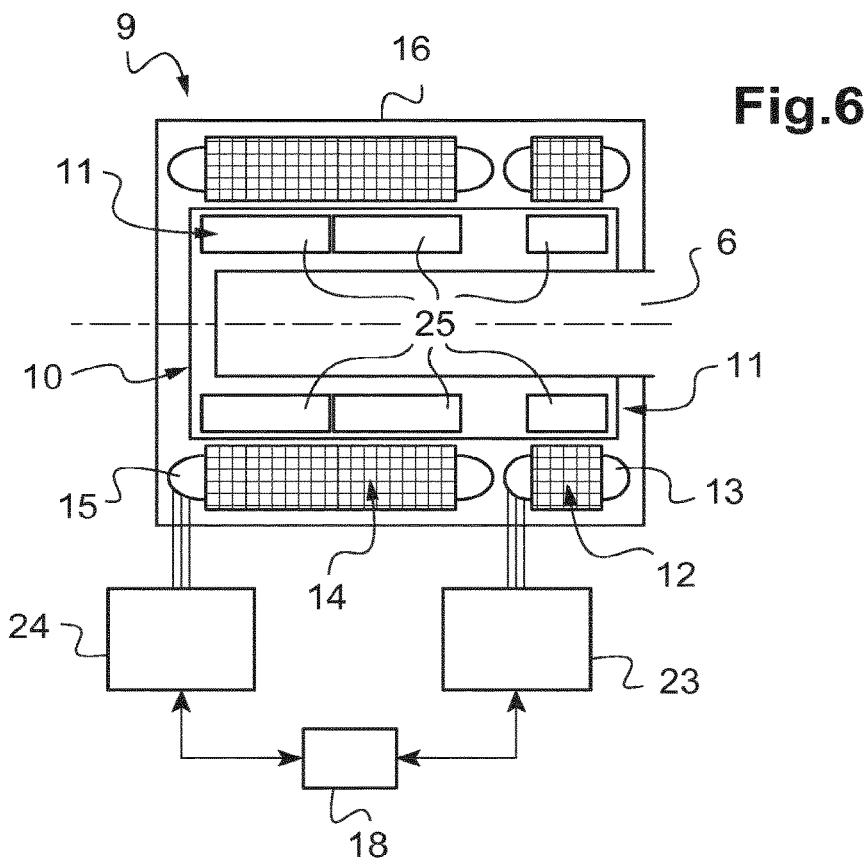
FIG. 6 shows a partial schematic longitudinal section view of a synchronous motor of a vacuum pump according to a third embodiment.

FIG. 6 shows another embodiment, in which each permanent magnet 11 of the rotor 10 comprises a plurality of permanent magnet elements 25. The permanent magnet elements 25 are aligned along the rotor 10, but in this example they only extend into the rotor 10 in the regions of the rotor 10 that are located opposite a stator 12, 14 with windings 13, 15. Filler elements, for example, made of plastic, can be inserted into the groove between a permanent magnet element 25 facing the first stator 12 with windings 13 and a permanent magnet element 25 facing the second stator 14 with windings 15. Costs are thus limited by avoiding the provision of unnecessary permanent magnets.

Figure 7:
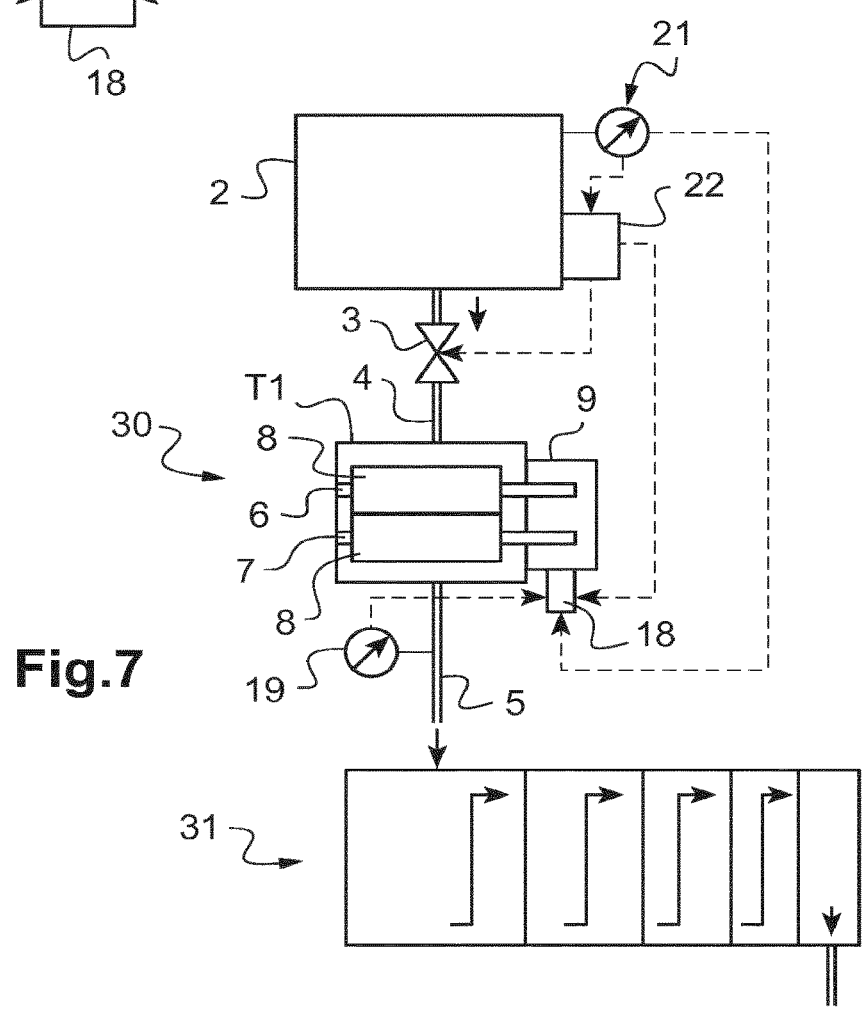
FIG. 7 shows a schematic view of a dry vacuum pump according to another embodiment, connected to a chamber.

FIG. 7 shows an example of a vacuum pump 30 of the "Blower Roots" type connected to a chamber 2. The vacuum pump 30 is mounted in series and upstream of a rough-vacuum pump 31.

The vacuum pump 30 comprises a single pumping stage T1 having an intake 4 and an outlet 5, two shafts 6, 7 each supporting a pumping rotor 8 and a synchronous motor 9 configured to rotate the drive shaft 6.

The pumping rotors 8 have lobes with identical profiles of the Roots type that are angularly offset and are driven in order to synchronously rotate in reverse in the pumping stage T1.

The Roots vacuum pump 30 mainly differs from the rough-vacuum pump 1 through a greater pumping capacity, greater clearance tolerances and through the fact that the Roots vacuum pump 30 does not discharge at the atmospheric pressure but must be used mounted in series upstream of a rough-vacuum pump 31.

As in the first embodiment, the synchronous motor 9 comprises a rotor 10 with permanent magnets 11 mounted on the drive shaft 6, a first stator 12 with windings 13 arranged around the rotor 10 and at least one second stator 14 with windings 15 also arranged around the rotor 10.

The windings 13, 15 of the first and of the second stators 12, 14 can produce equivalent or different electromotive forces. The power ratio between the power generated by the first stator 12 and the power generated by the second stator 14 is, for example, between 1 and 10.

Provision is made, for example, in the case of a "Blower Roots" vacuum pump 30 connected to a load lock, for the power generated by the first stator 12 to be approximately 1.5 kW and for the power generated by the second stator 14 to be approximately 8.5 kW.

During operation, the supply of the windings 13, 15 of the stators 12, 14 of the synchronous motor 9 of the vacuum pump 1 is modified as a function of at least one signal representing the pumping load, in order to adapt the power to at least one load threshold.

When the equipment 22 orders the opening of the valve 3, the two stators 12, 14 of the synchronous motor 9 are supplied. The available power is then approximately 10 kW (discharge step 101).

When the pressure inside the chamber 2 crosses a predetermined load threshold, the pumping load has dropped enough so that the control unit 18 only supplies one of the two stators 12 (ultimate vacuum pumping step 102, FIG. 4). The available power is then approximately 1.5 kW.

The invention claimed is:

1. A dry vacuum pump, comprising:
   two shafts, respectively supporting at least one pumping rotor being configured to synchronously rotate in reverse in order to convey a gas to be pumped from an intake of the dry vacuum pump to an outlet; and
   a synchronous motor configured to rotate one shaft of the two shafts, the synchronous motor comprising: a rotor coupled to one of the shafts,
   a first stator with windings arranged around the rotor, and
   at least one second stator with windings arranged around the rotor, the windings of the stators being configured to be supplied individually or simultaneously in order to adapt a power of the synchronous motor to a pumping load.

2. The dry vacuum pump according to claim 1, wherein the windings of the stators are configured to be supplied individually when the pumping load of the dry vacuum pump is below a load threshold, and to be supplied simultaneously when the pumping load of the dry vacuum pump is greater than or equal to the load threshold.

3. The dry vacuum pump according to claim 1, wherein a power ratio between a power generated by the first stator and a power generated by the at least one second stator is between 1 and 10.

4. The dry vacuum pump according to claim 1, wherein the dry vacuum pump is a rough-vacuum pump comprising a plurality of pumping stages mounted in series, a power ratio between a power generated by the first stator and a power generated by the at least one second stator being between 1 and 5.

5. The dry vacuum pump according to claim 1, wherein the dry vacuum pump is a Roots vacuum pump, which is configured to be connected to a chamber, in series and upstream of a rough-vacuum pump.

6. The dry vacuum pump according to claim 1, wherein the rotor comprises permanent magnets.

7. The dry vacuum pump according to claim 6, wherein at least one permanent magnet of the rotor is formed by a plurality of permanent magnet elements aligned along the rotor.

8. The dry vacuum pump according to claim 7, wherein the plurality of permanent magnet elements of the rotor only extend into the rotor facing the stators with the windings.

9. The dry vacuum pump according to claim 1, further comprising a first speed variator connected to the first stator with the windings, and a second speed variator connected to the at least one second stator with the windings.

10. The dry vacuum pump according to claim 9, further comprising:
    a control unit connected to the speed variators that is configured to supply the windings of the stators individually or simultaneously in order to adapt the power of the synchronous motor to the pumping load as a function of at least one signal representing the pumping load.

11. The dry vacuum pump according to claim 10, wherein the at least one signal representing the pumping load is a current-limiting output of one of the speed variators, representing a current consumed by the dry vacuum pump.

12. A method for controlling a synchronous motor of a dry vacuum pump according to claim 1, for pumping a chamber connected to the dry vacuum pump, wherein the windings of the stators are supplied individually when the pumping load of the dry vacuum pump is below a load threshold, and the windings are supplied simultaneously when the pumping load of the dry vacuum pump is above the load threshold, in order to adapt the power of the synchronous motor to the pumping load as a function of at least one signal representing the pumping load.

13. The method according to claim 12, wherein a most powerful of the two stators or both of the stators is supplied simultaneously upon start-up of the dry vacuum pump or in a step of discharging, starting from atmospheric pressure.

14. The method according to claim 12, wherein a step of discharging, starting from atmospheric pressure, and an ultimate vacuum pumping step occur cyclically inside the chamber.

\* \* \* \* \*